United States Patent [19]

Matsumura et al.

[11] Patent Number: 5,856,400
[45] Date of Patent: Jan. 5, 1999

[54] POLYPROPYLENE RESIN COMPOSITION

[75] Inventors: Takenobu Matsumura; Masahiro Naiki, both of Ube; Takao Nomura, Toyota; Takeyoshi Nishio, Okazaki, all of Japan

[73] Assignees: Ube Industries, Ltd., Ube; Toyota Jidosha Kabushiki Kaisha, Toyota, both of Japan

[21] Appl. No.: 705,215

[22] Filed: Aug. 29, 1996

[30] Foreign Application Priority Data

Dec. 18, 1995 [JP] Japan ................................. 7-347551

[51] Int. Cl.$^6$ ............................. C08K 3/34; C08L 23/10
[52] U.S. Cl. ............................. 524/525; 524/515
[58] Field of Search ..................... 524/515, 525

[56] References Cited

FOREIGN PATENT DOCUMENTS

| | | |
|---|---|---|
| B-58-25693 | 5/1983 | Japan . |
| B-58-38459 | 8/1983 | Japan . |
| A-60-58459 | 4/1985 | Japan . |
| A-60-60154 | 4/1985 | Japan . |
| A-62-235350 | 10/1987 | Japan . |
| A-63-122751 | 5/1988 | Japan . |
| B-63-42929 | 8/1988 | Japan . |
| A-1-149845 | 6/1989 | Japan . |
| A-1-204947 | 8/1989 | Japan . |
| A-1-271450 | 10/1989 | Japan . |
| A-7-18151 | 1/1995 | Japan . |
| A-7-109316 | 4/1995 | Japan . |

OTHER PUBLICATIONS

G. Natta & P. Corradini, *Suppl. Nuovo Cimento,* vol. 15, 1960, pp. 40–51.

M. Hikosaka & T. Seto, *Polymer Journal,* vol. 5, No. 2, 1973, pp. 111–127.

*Primary Examiner*—Kriellion A. Sanders
*Attorney, Agent, or Firm*—Finnegan, Henderson, Farabow, Garrett & Dunner, L.L.P.

[57] ABSTRACT

A polypropylene resin composition comprising an isotactic polypropylene component, a rubber component, and an inorganic filler component, wherein (a) the melt flow rate, according to ASTM D1238, is 20 g/10 min or more, (b) the flexural modulus, according to ASTM D790, is 2300 MPa or more, (c) the Izod impact strength, according to ASTM D256, is 180 J/m or more at 23° C. and 45 J/m or more at −30° C., (d) the heat deformation temperature, according to ASTM D648, is 130° C. or more, and (e) there is a diffraction peak unique to polypropylene of space group P21/c in the diffraction pattern measured by the wide angle X-ray diffraction method in an injection molded article of the composition formed under a quenching condition.

4 Claims, 7 Drawing Sheets

POLYPROPYLENE RESIN COMPOSITION

BACKGROUND OF THE INVENTION

1. Field of the Invention

The present invention relates to a polypropylene resin composition. More specifically, it relates to a polypropylene resin composition having a superior fluidity of the molten resin when injection molding and, capable of providing a shaped article having a high rigidity, high low-temperature impact resistance, and superior heat resistance, and suitable for use as an auto part or other structural member.

2. Description of the Related Art

A polypropylene resin is easy to mold and, among conventional resins, has a high melting point, and therefore, has a superior heat resistance and further light weight. Thus, a polypropylene resin is widely used in the numerous industrial fields such as automobiles, electrical parts. However, a polypropylene resin is not necessarily sufficient, compared with other conventional resins, in the applications where a high rigidity and low-temperature impact resistance are simultaneously demanded.

The low-temperature impact resistance of a polypropylene resin becomes inferior due to the fact that the secondary transition point of polypropylene is around 0° C. That is, at a temperature of less than 0° C., the motion of the polypropylene molecular chains freezes, which results in a glass state, and therefore, the energy of external impact cannot be absorbed, whereby breakage occurs.

Therefore, as a means for improving the low-temperature impact resistance of polypropylene, in the past a polymer having rubbery properties and a secondary transition point of less than approximately −50° C. is mixed into the polypropylene. Examples of such a polymer having rubbery properties are ethylene-α-olefin copolymers, which are generally amorphous and low in crystallinity.

For example, Japanese Examined Patent Publication (Kokoku) No. 58-25693 and Japanese Examined Patent Publication (Kokoku) No. 58-38459 disclose compositions including crystalline polypropylene and an ethylene-butene-1 copolymer comprising not more than 15 molar % of butene-1. However, the resultant compositions have low impact resistance at low temperatures. Further, Japanese Examined Patent Publication (Kokoku) No. 63-42929 discloses a polypropylene composition containing an ethylene-butene-1 copolymer. However, in this case as well while the impact resistance is improved, the heat resistance is not sufficient.

When a rubbery substance is added to a polypropylene resin as explained above, the low-temperature impact resistance is improved with the increase in the amount of the rubbery substance added. However, when a large amount of the rubbery substance is included, the rigidity, heat deformation temperature, and surface hardness of the resultant composition are all largely decreased.

Therefore, there are limits to the addition of the rubbery substance. Methods for the simultaneous addition of talc or another inorganic filler are known so as to maintain the rigidity, but there are also limits to the amount of addition of the filler. Namely, when a large amount of the filler is added, the toughness is lost and the effect of addition of the rubber, that is, the impact resistance, is also impaired, and therefore, it has been difficult to use such a composition for applications where a high rigidity and ordinary-temperature and low-temperature impact resistance are simultaneously required.

Further, for example, polypropylene compositions containing a rubbery substance and inorganic fillers such as talc have been proposed (see Japanese Unexamined Patent Publication (Kokai) No. 60-58459, Japanese Unexamined Patent Publication (Kokai) No. 60-60154, Japanese Unexamined Patent Publication (Kokai) No. 62-235350, Japanese Unexamined Patent Publication (Kokai) No. 63-122751, Japanese Unexamined Patent Publication (Kokai) No. 1-149845, Japanese Unexamined Patent Publication (Kokai) No. 1-204947, Japanese Unexamined Patent Publication (Kokai) No. 1-271450, etc.). However, these compositions also have little effect in simultaneously achieving both rigidity and impact resistance.

SUMMARY OF THE INVENTION

Accordingly, the objects of the present invention are to eliminate the above-mentioned disadvantageous of the prior art and to provide a polypropylene resin composition which is superior in both the properties of rigidity and low-temperature impact resistance and is also superior in heat resistance.

Other objects and advantages of the present invention will be apparent from the following description.

In accordance with the present invention, there is provided a polypropylene resin composition comprising of an isotactic polypropylene component, a rubber component, and an inorganic filler component, wherein (a) the melt flow rate, according to ASTM D1238, is at least 20 g/10 min;

(b) the flexural modulus, according to ASTM D790, is at least 2300 MPa;

(c) the Izod impact strength, according to ASTM D256, is at least 180 J/m at 23° C. and at least 45 J/m at −30° C.;

(d) the heat deformation temperature, according to ASTM D648, is at least 130° C.; and (e) there is a diffraction peak unique to polypropylene of space group P21/c in a diffraction pattern measured by a wide angle X-ray diffraction method in an injection molded article of the composition formed under a quenching condition.

The term "a quenching condition" used herein means that the cylinder temperature is about 200° to 230° C. and the die temperature is about 30° to 50° C. at the time of injection molding.

In accordance with the present invention, there is also provided a polypropylene resin composition comprising:

(I) 50 to 70% by weight of a polypropylene block copolymer composed of 15 to 30% by weight of α-olefin structural units in a propylene-α-olefin random copolymer constituting a soluble component in p-xylene at room temperature and containing 7 to 15% by weight of a propylene-α-olefin random copolymer component or a blend thereof with an isotatic polypropylene;

(II) 10 to 35% of an ethylene-α-olefin random copolymer comprised of 30 to 85% by weight of ethylene structural units; and (III) 5 to 25% of an inorganic filler.

BRIEF DESCRIPTION OF THE DRAWINGS

The present invention will be better understood from the description set forth below with reference to the accompanying drawings, wherein.

DESCRIPTION OF THE PREFERRED EMBODIMENTS

The present inventors researched methods for solving the above-mentioned problems and, as a result, found that the rigidity of a polypropylene resin composition is dependent on the content of the polypropylene, except for the contribution of the inorganic filler and when the content of the polypropylene is the same, is dependent on the crystallinity of the polypropylene, and that when the crystallinity is the same, the greater the proportion of crystals with the stablest crystal structure, that is, the greatest crystal modulus, the higher the rigidity.

Further, regarding the rubber component for improving the low-temperature impact resistance of the polypropylene resin composition, when the dispersibility of the rubber component is poor and the rubber component floats in the polypropylene in the form of large islands, the rubber component will largely deform upon external force, and therefore the rigidity is remarkably decreased. However, when the dispersibility is good, the polypropylene component will act to restrain the deformation of the rubber and therefore the reduction in the rigidity will be suppressed. Further, it was found that, if the rubber component is dispersed extremely finely so as to enter between the lamellae crystals, a high impact resistance, together with a high rigidity will be exhibited, and as the lamellae crystals will be a stablest crystal structure, the crystal modulus becomes high and, as a result, the rigidity of the composition becomes high.

Considering the above all together, a polypropylene resin composition having a high rigidity and low-temperature impact resistance is preferably comprised of three components of a highly crystalline polypropylene, a rubber component having a glass transition point of approximately –50° C. or less, and an inorganic filler. The polypropylene must easily form crystals of the stablest crystal structure, the rubber component must be dispersed extremely finely. Thus, the composition should be easily controlled in the higher order structure. More specifically, the polypropylene must have a high tacticity easily providing a crystal structure of the space group P21/c reported as being the stablest crystal structure.

On the other hand, the rubber component must be able to be dispersed finely and the part thereof must be able to be dissolved even in an amorphous portion in the lamellae crystal of the polypropylene, whereby the higher order structure with finely dispersed rubber between the high crystal modulus lamellae crystal be formed. A structure having a highly dispersed texture is obtained by the presence of the propylene-α-olefin copolymer rubber component having a large content of propylene component obtained from a polypropylene block copolymer, together with an ethylene-α-olefin copolymer. Only when these are achieved, the desired polypropylene molded product having a high rigidity and a high impact resistance even at low temperatures can be obtained.

In the first aspect of the present invention, there is provided a polypropylene resin composition comprised of an isotactic polypropylene component (preferably 55 to 68 wt %), a rubber component (preferably 12 to 30 wt %), and an inorganic filler component (preferably 10 to 20 wt %), wherein (a) the melt flow rate, according to ASTM D1238, is at least 20 g/10 min, preferably 25 to 30 g/10 min;

(b) the flexural modulus, according to ASTM D790, is at least 2300 MPa, preferably 2400 to 2600 MPa;

(c) the Izod impact strength, according to ASTM D256, is at least 180 J/m at 23° C., preferably 200 to 300 J/m, and at least 45 J/m at –30° C., preferably 45 to 50 J/m;

(d) the heat deformation temperature, according to ASTM D648, is at least 130° C., preferably 132° C. to 135° C.; and (e) there is a diffraction peak unique to polypropylene of the space group P21/c in a diffraction pattern measured by the wide angle X-ray diffraction method in an injection molded article of the composition formed under a quenching composition (for example, the cylinder temperature is about 200° to 230° C. and the die temperature is about 30° to 50° C. at the time of injection molding).

In the second aspect of the present invention, there is provided a polypropylene resin composition for providing the polypropylene resin composition according to the first aspect of the present invention which is comprised of:

(I) 50 to 70% by weight, preferably 52 to 68% by weight, of a polypropylene block copolymer composed of 15 to 30% by weight, preferably 20 to 27% by weight, of α-olefin structural units in a propylene-α-olefin random copolymer constituting a component soluble in a p-xylene at room temperature and serving as the rubber component, and containing 7 to 15% by weight, preferably 8 to 12% by weight, of a propylene-α-olefin copolymer component and the balance of an isotactic polypropylene, or a blend of said polypropylene block copolymer with an isotatic polypropylene;

(II) as an additional rubber component, 10 to 35% by weight, preferably 15 to 30% by weight, of an ethylene-α-olefin random copolymer composed of 30 to 85% by weight, preferably 50 to 80% by weight, of ethylene structural units; and (III) 5 to 25% by weight, preferably 10 to 20% by weight, of an inorganic filler (where, the component (I), component (II), and component (III) total 100 wt %).

In the present invention, the polypropylene of the first component (i.e., component (I) described in claim 2) may be (i) a mixture of a propylene homopolymer with a block copolymer of propylene and ethylene or other α-olefin, or (ii) a polypropylene block copolymer alone. The polypropylene block copolymer can be obtained by polymerization of propylene to produce an isotactic polypropylene in the first stage and the copolymerization of the propylene and ethylene or other α-olefin in the second stage and includes in the component an isotactic polypropylene and rubbery propylene-α-olefin random copolymer or propylene-ethylene random copolymer. In order for the desired effect of the present invention to be exhibited, it is particularly necessary that the stereoregularity of the isotactic polypropylene contained in the component is high and specifically a diffraction peak derived from the space group P21/c be observed in the X-ray diffraction pattern of an injection molded article formed under a quenching condition.

On the other hand, the propylene-α-olefin random copolymer in the polypropylene block copolymer is necessary for improving the dispersibility of the ethylene-α-olefin random copolymer as the rubber component additionally added for increasing the impact resistance. It should be a propylene-α-olefin random copolymer containing a certain amount of α-olefin.

The above-mentioned various components will be explained in further detail below.

The crystal structure of an isotactic polypropylene has been reported by Natta et al. to be a monoclinic crystal system of space group C2/c or Cc (see G. Natta, P. Corradini, Suppl. Nuovo Cimento, 15, 40 (1960)).

Later, Seto et al. reported that by the high temperature heat treatment of an isotactic polypropylene, the space group changes from C2/c or Cc to P21/c and the crystal structure changes to the stablest structure (see M. Hikosaka, T. Seto, Polymer J., 5, No. 2, 111 (1973)).

From the extinction rule of X-ray diffraction, in the case of the space group C2/c, h+k=odd number in the diffraction planes hk1 become extinct and cannot be observed, while there is no extinction rule for the space group P21/c. Accordingly, the diffraction planes which can be observed in the space group P21/c are h+k=odd number, for example, 290, 380, 141, -231, -161, 211, -251. As opposed to this, with the space group C2/c or Cc, these diffraction planes become extinct.

Accordingly, it is possible to easily confirm what kind of space group the crystal structure has in the polypropylene component of an injection molded article by referring to the extinction rule of the X-ray diffraction peak. A crystal structure of the space group P21/c has the methyl group in the polypropylene having regularity of orientation in the crystal lattice, while with the space group C2/c, there are a confusion of orientations in the crystal lattice. Crystals exhibiting the C2/c space group have molecular chains which are rearranged by high temperature heat treatment and change to the completest and stablest crystal structure P21/c so as to form lamellae crystals of polypropylene in the composition having the highest crystal modulus. Accordingly, lamellae crystals with a high rigidity are formed.

In the present invention, it is necessary that the isotactic polypropylene component in an injection molded article formed under quenching or rapid cooling conditions have the stablest structure, that is, the space group P21/c. To form the space group P21/c without high temperature heat treatment, the isotactic polypropylene must have a high stereoregularity and lower molecular weight comparatively. The pentad isotacticity found by $C^{13}$-NMR, used as a measure of the stereoregularity, is correlated with the amount of formation of the crystal structure of the P21/c space group. A polypropylene with a low pentad isotacticity does not exhibit a diffraction peak derived from P21/c.

When molecular chains of an isotactic polypropylene of a high stereoregularity crystallize, the methyl groups in the monoclinic system orient regularly in the crystal lattice to form the stablest crystal structure, and therefore, form crystals of a high density and few defects. The existence of crystals having a high crystal modulus contributes to the improvement of the rigidity of polypropylene molded articles.

The reason for use of a polypropylene block copolymer as the structural unit in the present invention is to assist the ultra-fine dispersion of the rubber component. The propylene-α-olefin random copolymer serving as the amorphous or low crystallinity component in the polypropylene copolymer according to the present invention is a p-xylene soluble component at room temperature, namely, the rubber phase. It is comprised of 70 to 85% by weight of a propylene component, more preferably 73 to 80% by weight, with the remainder being an α-olefin component. Since the rubber phase is close to an isotactic polypropylene even in the composition thereof, it is very compatible with an isotactic polypropylene, and therefore, an extremely finely dispersed rubber phase can be obtained.

Although it has been commonly carried out by blending a polypropylene with a rubber component to obtain a low-temperature impact resistance mere blending is not enough to ensure the fine dispersion of the rubber component. In order to disperse the rubber component finely, it is preferable to blend it in a polypropylene block copolymer. Further, the polypropylene block copolymer preferably contains 7 to 15% by weight, more preferably 8 to 12% by weight, of a propylene-α-olefin random copolymer comprising 70 to 85% by weight, more preferably 73 to 80% by weight, of propylene.

In the present invention, since the amount of rubber composed of the propylene-α-olefin random copolymer in the polypropylene block copolymer is insufficient to obtain a low-temperature impact resistance, it is further necessary to additionally add an ethylene-α-olefin random copolymer. The rubber component added usually includes a large ethylene component and is incompatible with an isotactic polypropylene. Therefore, the ultra-fine dispersion of the additional rubber component is achieved by the interpenetration of the rubber component composed of the propylene-α-olefin random copolymer in the polypropylene block copolymer.

In the present invention, the ethylene-α-olefin random copolymer additionally blended in the polypropylene block copolymer preferably includes 30 to 85% by weight of ethylene structural units, more preferably 50 to 80% by weight.

When the injection molded articles of the composition according to the present invention is analyzed, the rubber component extends thinly and flatly in the direction of injection at the surface portion where the shearing force acts strongly at the time of molding. However, the internal portion becomes a somewhat deformed spherical shape. Observation of ultrathin slices of the surface portion of injection molded articles shows that, unlike with an island-in-sea structure, the rubber phase invades even between the lamellae crystals and the lamellae crystals penetrate the rubber region to the extent that it is not clear which of the rubber component and the polypropylene phase constitute the islands. On the other hand, at the inside of the shaped articles, since the shearing force received at the time of molding is small, the rubber component becomes spherical slightly deformed in the direction of injection, but the lamellae crystals of the isotactic polypropylene invade the rubber phase and intermix with the rubber phase in structure.

In this way, by use of a polypropylene block copolymer including a rubber phase of a specific composition close to that of an isotactic polypropylene, it becomes possible to disperse the additional rubber component very finely and possible to achieve simultaneously a high rigidity and low-temperature impact resistance in the molded article.

Next, the components of the composition of the present invention will be specifically explained in detail.

Polypropylene Block Copolymer

The polypropylene block copolymer can be considered a mixture of an isotactic polypropylene and a propylene-α-olefin random copolymer. Here, the isotactic polypropylene component is 85 to 93% by weight, more preferably 87 to 90% by weight, and the balance is composed of the propylene-α-olefin random copolymer. Further, the propylene-α-olefin random copolymer is comprised of 15 to 30% by weight, more preferably 20 to 27% by weight, of α-olefin structural components. In the case of a polypropylene block copolymer having a high content of the propylene-α-olefin random copolymer, it is also possible to blend the isotactic polypropylene to obtain a predetermined content of the propylene-α-olefin random copolymer and possible to mix propylene block copolymers containing propylene-α-olefin random copolymers with different contents of α-olefin components so as to obtain a predetermined content of the propylene-α-olefin random copolymer in the resultant polypropylene block copolymer.

The isotactic polypropylene component in the polypropylene block copolymer according to the present invention has to have a high stereoregularity and lower molecular weight comparatively. Specifically, when using X-ray diffraction to examine test pieces prepared by injection molding the composition according to the present invention under usual conditions, it is preferable that the stereoregularity be high enough so that a diffraction peak unique to the space group P21/c can be observed. When the stereoregularity is low or when the molecular weight is high and consequently the molecular mobility is low, if the composition is injection molded under the quenching or rapid cooling conditions, it is difficult to form the stablest crystal structure, that is, crystals of P21/c.

The reason for the 15 to 30% by weight content of the α-olefin structural units of the propylene-α-olefin random copolymer in the polypropylene block copolymer is that, if the content is less than 15% by weight, the content of propylene becomes too large so that the compatibility with the isotactic polypropylene becomes too high and, as a result, the crystallinity of the isotactic polypropylene is unpreferably impaired and the rigidity of the polypropylene resin composition thus obtained is unpreferably lowered. Further, the state of fine dispersion of the rubber component required for absorbing impact is lost, and therefore, the low-temperature impact resistance is unpreferably decreased. Further, if the content of the α-olefin is more than 30% by weight, conversely the compatibility with the isotactic polypropylene becomes poor and it becomes impossible to form an ultrafinely dispersed rubber phase, the rubber phase becomes large islands in form, and conversely a reduction in the rigidity of the obtained polypropylene resin composition and a reduction in the surface hardness are induced.

The amount of the isotactic polypropylene component in the polypropylene block copolymer or the blend of the block copolymer and isotactic polypropylene is, as mentioned above, preferably in the range of 85 to 93% by weight. If the content of the isotactic polypropylene component is less than 85% by weight, the resultant polypropylene resin composition has a lower rigidity and the heat resistance thereof is also impaired. Further, if the content is more than 93% by weight, there is too little of the rubber component, fine dispersion of the rubber cannot be achieved, and the low-temperature impact resistance of the obtained polypropylene resin composition is unpreferably impaired.

The weight average molecular weight of the isotactic polypropylene component in the polypropylene block copolymer or the blend of the block copolymer and isotactic polypropylene is preferably in the range of $17 \times 10^4$ to $34 \times 10^4$. Further, the pentad isotacticity of said isotactic polypropylene component is preferably 96% or more. If the weight average molecular weight of said isotactic polypropylene component is more than $34 \times 10^4$ and the pentad isotacticity is less than 96%, the resultant polypropylene resin composition has a lower molecular mobility. Accordingly in this case, if the composition is injection molded under the said quenching or rapid cooling conditions, it is difficult to form the stablest crystal structure, that is, crystals of the space group P21/c.

Further, in the present invention, the amount of the polypropylene block copolymer or the blend thereof with an isotactic polypropylene is preferably in the range of 50 to 70% by weight, more preferably 52 to 68% by weight. If this amount is less than 50% by weight, the rigidity of the resultant polypropylene resin composition is decreased and the heat resistance is impaired, while if more than 70% by weight, the amount of the rubber component in the resultant polypropylene resin composition becomes smaller and the low-temperature impact resistance becomes poorer. Both of these cases are therefore not desirable.

The α-olefin of the propylene-α-olefin random copolymer component contained in the polypropylene block copolymer specifically refers to a polymerizable monomer such as ethylene, 1-butene, 1-pentene, 1-hexene, 1-heptene, 1-octene, 1-decene, 1-dodecene, and 4-methyl-1-pentene.

Ethylene-α-Olefin Random Copolymer

Next, the ethylene-α-olefin random copolymer constituting the composition of the present invention is an amorphous or low crystallinity rubber component having an ethylene content of 30 to 85% by weight. The α-olefin of the ethylene-α-olefin random copolymer specifically refers to a polymerizable monomer such as propylene, 1-butene, 1-pentene, 1-hexene, 1-heptene, 1-octene, 1-decene, 1-dodecene, and 4-methyl-1-pentene.

When the amount of the ethylene structural units is less than 30% by weight, the glass transition point is increased and the low-temperature impact resistance of the obtained polypropylene resin composition is decreased. Further, if the amount of the ethylene structural units is more than 85% by weight, the compatibility with the isotactic polypropylene becomes poor, and therefore, the fine dispersion cannot be obtained and the rigidity of the resultant polypropylene resin composition becomes poorer.

The amount of the ethylene-α-olefin random copolymer used in the present invention is preferably in the range of 10 to 35% by weight. If the amount added is less than 10% by weight, the low-temperature impact resistance of the resultant polypropylene resin composition becomes poor, while if more than 35% by weight, the rigidity and heat resistance of the resultant polypropylene resin composition are unpreferably impaired.

Inorganic Filler

The inorganic filler used in the present invention may be, for example, calcium carbonate, mica, talc, etc. Among these, finely powdered talc is preferably used. In particular, the talc having an average particle size of 0.5 to 10 μm and an aspect ratio (i.e., the ratio of diameter/thickness of flat talc) of at least 5 is preferred.

The amount of the above-mentioned inorganic filler added in the present invention is preferably in the range of 5 to 25% by weight, more preferably in the range of 10 to 20% by weight. If the amount is less than 5% by weight, the effect of improvement in the hardness of the shaped article is low, while if more than 25% by weight, the hardness of the molded article becomes too large and the impact strength is conversely decreased to result in a remarkable reverse effect. Neither of these cases is desirable.

The polypropylene resin composition according to the present invention may contain, to an extent not impairing the object of the present invention, conventional additives such as an antioxidant, heat stabilizer, nucleating agent, UV absorbent, lubricant, anti-static agent, flame retardant, pigment, dye, inorganic fillers other than talc, organic fillers, etc.

EXAMPLES

The present invention will now be further illustrated by, but is by no means limited to, the following Examples.

Example 1

Various types of isotactic polypropylenes shown in Table I having substantially the same molecular weights but different stereoregularity (pentad isotacticity by $C^{13}$-NMR) were polymerized.

TABLE I

| Sample | Mw × $10^{-4*1}$ | Mw/Mn*2 | Tm (°C.)*3 | Pentad isotacticity mmmm % |
|---|---|---|---|---|
| 1 | 13.7 | 2.4 | 161.5 | 92.2 |
| 2 | 17.2 | 3.6 | 164.1 | 94.3 |
| 3 | 14.2 | 4.0 | 165.6 | 96.9 |
| 4 | 13.7 | 2.9 | 161.5 | 92.2 |
| 5 | 17.2 | 3.6 | 164.1 | 94.3 |
| 6 | 14.2 | 4.0 | 165.6 | 96.9 |
| 7 | 27.7 | 3.4 | 162.6 | 92.3 |
| 8 | 23.1 | 5.7 | 166.1 | 96.3 |
| 9 | 26.8 | 2.9 | 169.4 | 97.7 |

(Notes)
*1Mw indicates weight average molecular weight.
*2Mn indicates number average molecular weight.
*3Tm indicates the melting point.

Example 2

Figure 1:
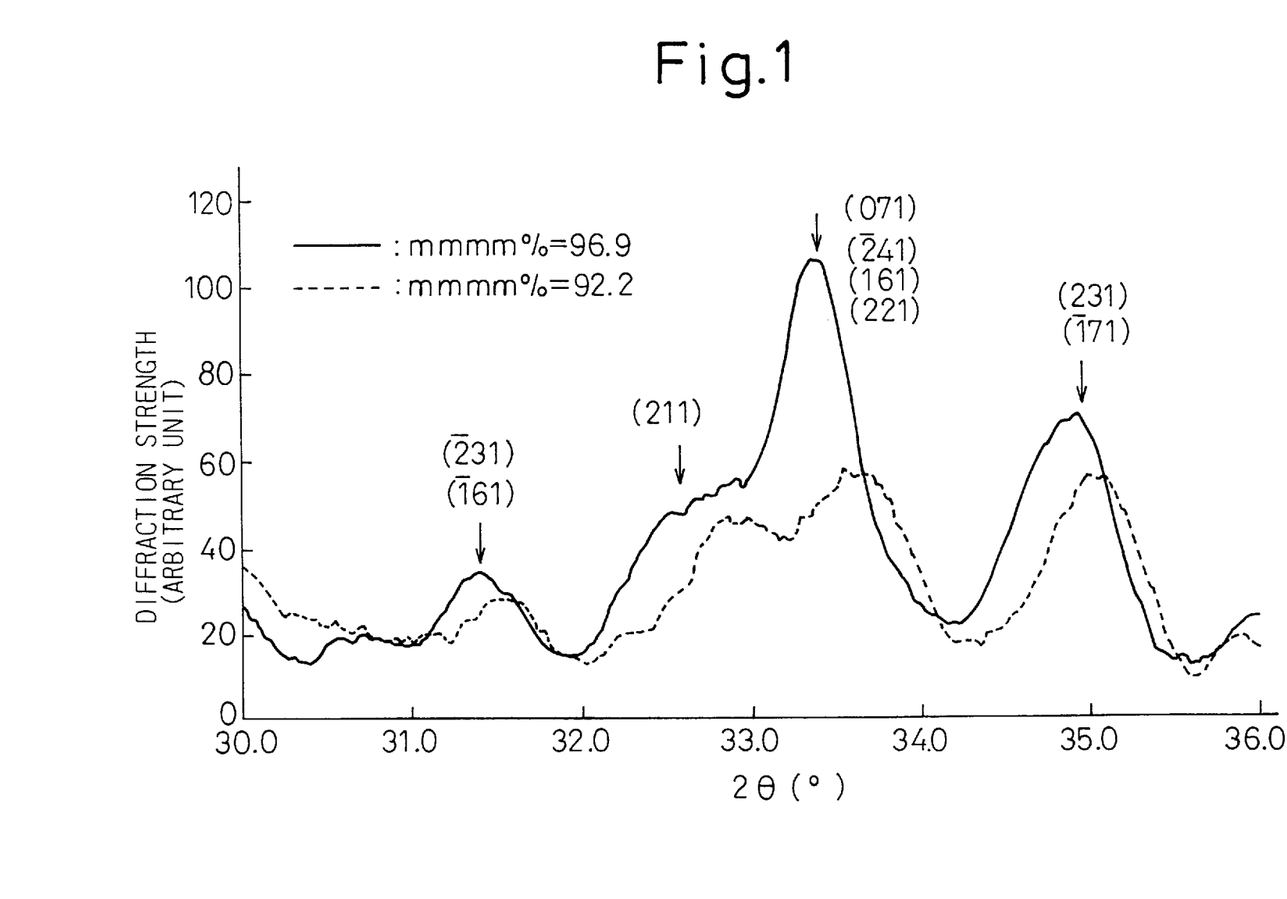
FIG. 1 is an X-ray diffraction pattern of a sample of Example 2.

The samples shown as Sample No. 4, 5 and 6 in Table I were heated to melt on a first stage hot plate at 230° C. for 3 minutes, then were transferred to a second stage hot plate set to the crystallization temperature of 60° C. where the samples were crystallized in a pressurized state for 30 minutes, then were introduced into ice water to obtain sheet-like samples. The X-ray diffractions thereof were measured by the reflection method, whereupon the X-ray diffraction patterns shown in FIG. 1 were obtained. As the X-ray diffraction planes which appear at the space group P21/c and do not appear at C2/c or Cc, note was taken of −231, −161 (d=2.849 Angstroms, 2θ=31.38°). As is clear from FIG. 1, the appearance of diffraction peaks derived from said diffraction planes is dependent on the tacticity of the polymer and happens first when the tacticity rises to 96.9%.

Example 3

The samples shown as Sample No. 4, 5 and 6 in Table I were treated similarly with Example 2 to obtain sheet-like samples except the second stage hot plates were set to the different crystallization temperatures. The X-ray diffractions thereof were measured by the reflection method, where upon the influence of the tecticity on the appearance of diffraction peaks based on P21/c more examined and the result shown in FIG. 2 were obtained.

Figure 2:
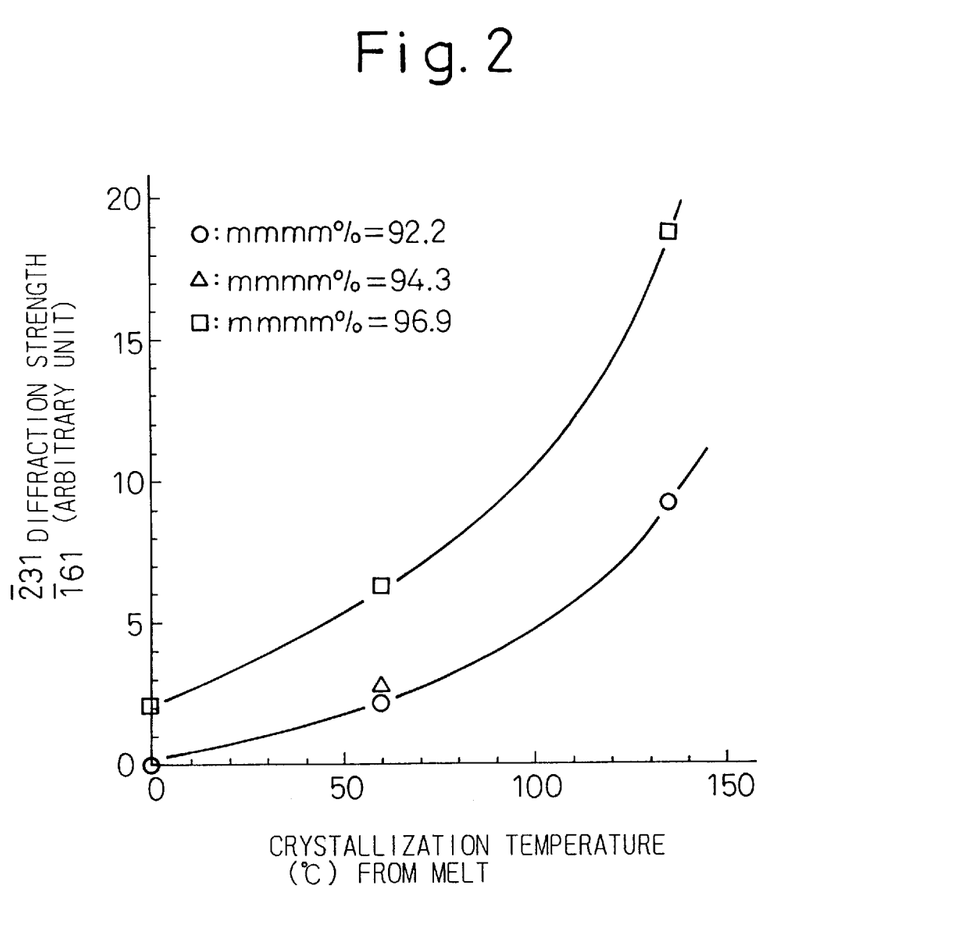
FIG. 2 is an X-ray diffraction pattern of a sample of Example 3.

As is clear from FIG. 2, the higher the crystallization temperature, the easier the appearance of a crystal structure of P21/c. At the same crystallization temperature, the higher the tacticity, the higher the rate of appearance.

Example 4

The states of dispersion of the rubber phases of a blend of an isotactic polypropylene and an ethylene-propylene random copolymer (E/P=73/27, where E represents the ethylene structural units and P the propylene structural units, which are same hereinbelow) and a blend of a polypropylene block copolymer and an ethylene-propylene random copolymer (E/P=73/27) were examined as follows. The compositions of the blends are shown in Table II. The total amount of the rubber was made the same in each sample.

TABLE II

| Sample | Composition | |
|---|---|---|
| No. 10 | i-PP*1 | 80 wt % |
|  | Added rubber component (E/P = 73/27)*2 | 20 wt % |
| No. 11 | i-PP*1 in block copolymer | 80 wt % |
|  | Rubber component (E/P = 30/70)*2 in block copolymer + added rubber component (E/P = 73/27) | 20 wt % |

(Note)
*1i-PP indicates isotactic polypropylene.
*2E indicates the ethylene structural units, and P the propylene structural units.

Figure 3:
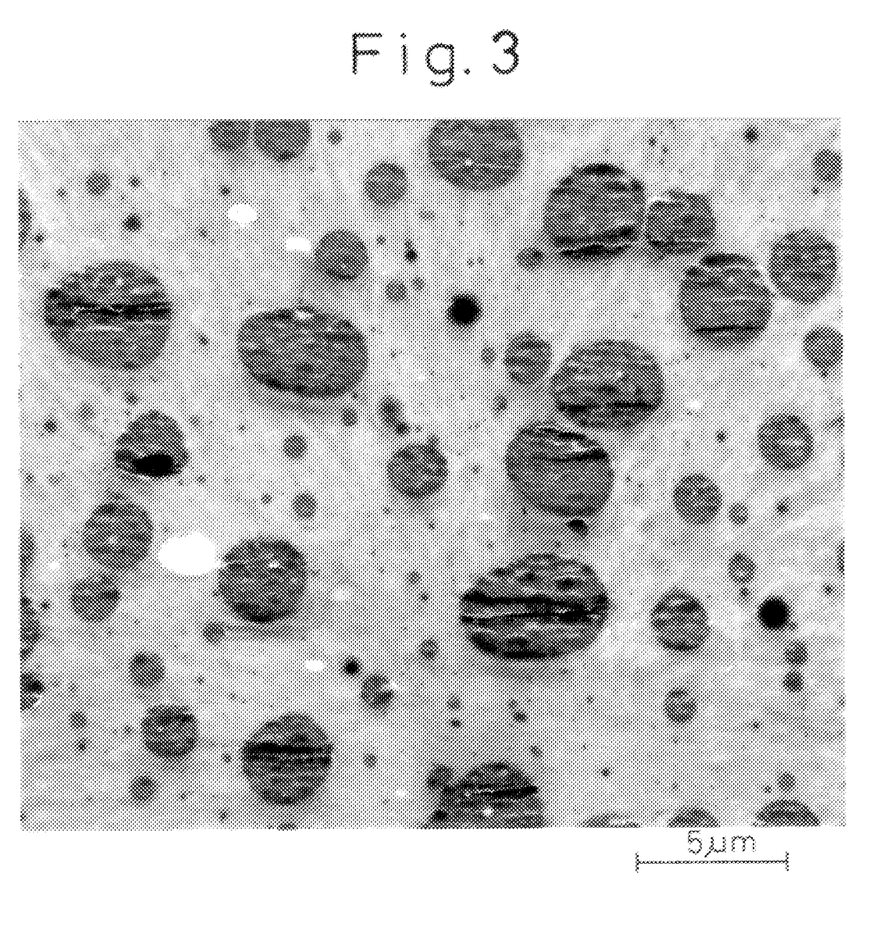
FIG. 3 is an electron micrograph of the state of dispersion of the rubber phase as a comparative example based on the sample 4 of Table II.
Figure 4:
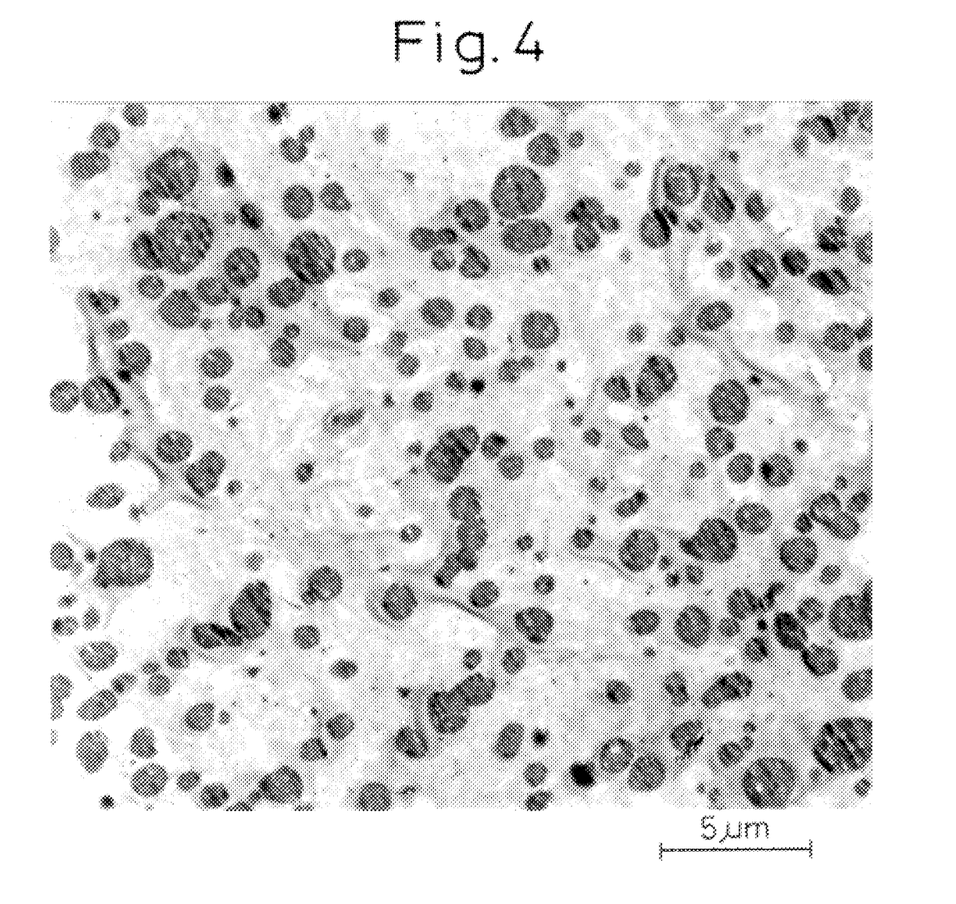
FIG. 4 is an electron micrograph of the state of dispersion of the rubber phase in Example 4 based on the sample 5 of Table II.

That is, for each of the above samples, the rubber phase was dyed by ruthenium tetroxide, ultrathin slices were prepared, and the state of dispersion of the rubber phase was observed by an electron microscope. The results are shown in the photographs of FIG. 3 and FIG. 4. When a rubber phase is blended with the isotactic polypropylene, the rubber phase disperses in the form of large islands, but when dispersing the rubber phase in a polypropylene block copolymer, the rubber phase disperses extremely finely.

From these results, it is clear that the propylene-ethylene random copolymer in the polypropylene block copolymer performs the role of causing fine dispersion of the rubber phase.

Examples 5 and 6

The compositions shown in Table III were obtained by melt kneading. ASTM test pieces were prepared under conditions of a resin temperature of 200° C. and a mold temperature of 40° C. The physical properties of the test pieces were measured.

The results are shown in Table III.

TABLE III

|  | Example | | Comparative Ex. |
|---|---|---|---|
|  | 5 | 6 | 1 |
| Propylene block copolymer | | | |
| i-PP component tacticity 98%*1 | 65 | — | — |
| i-PP component tacticity 96%*1 | — | 65 | — |
| i-PP component tacticity 94%*1 | — | — | 65 |
| Ethylene-α-olefin copolymer E/Bu-1 = 80/20*2 | 15 | 15 | 15 |

TABLE III-continued

|  | Example | | Comparative Ex. |
|---|---|---|---|
|  | 5 | 6 | 1 |
| Inorganic filler (talc) | 20 | 20 | 20 |
| MI (g/10 min)*³ ASTM D1238 | 34 | 33 | 25 |
| Flexural modulus (kg/mm²) ASTM D790 23° C. | 2500 | 2400 | 2200 |
| Izod impact strength (J/m) | | | |
| ASTM D256 23° C. | 340 | 325 | 148 |
| −30° C. | 44 | 43 | 30 |
| Heat deformation temperature (°C.) ASTM D648 18.5 kg/cm² | 90 | 89 | 84 |
| P21/c diffraction peak | Yes | Yes | No |

(Notes)
*¹i-PP indicates isotactic polypropylene.
*²E indicates ethylene structural units, Bu-1 indicates 1-butene structural units.
*³MI indicates melt flow rate.

Example 7

Figure 5:
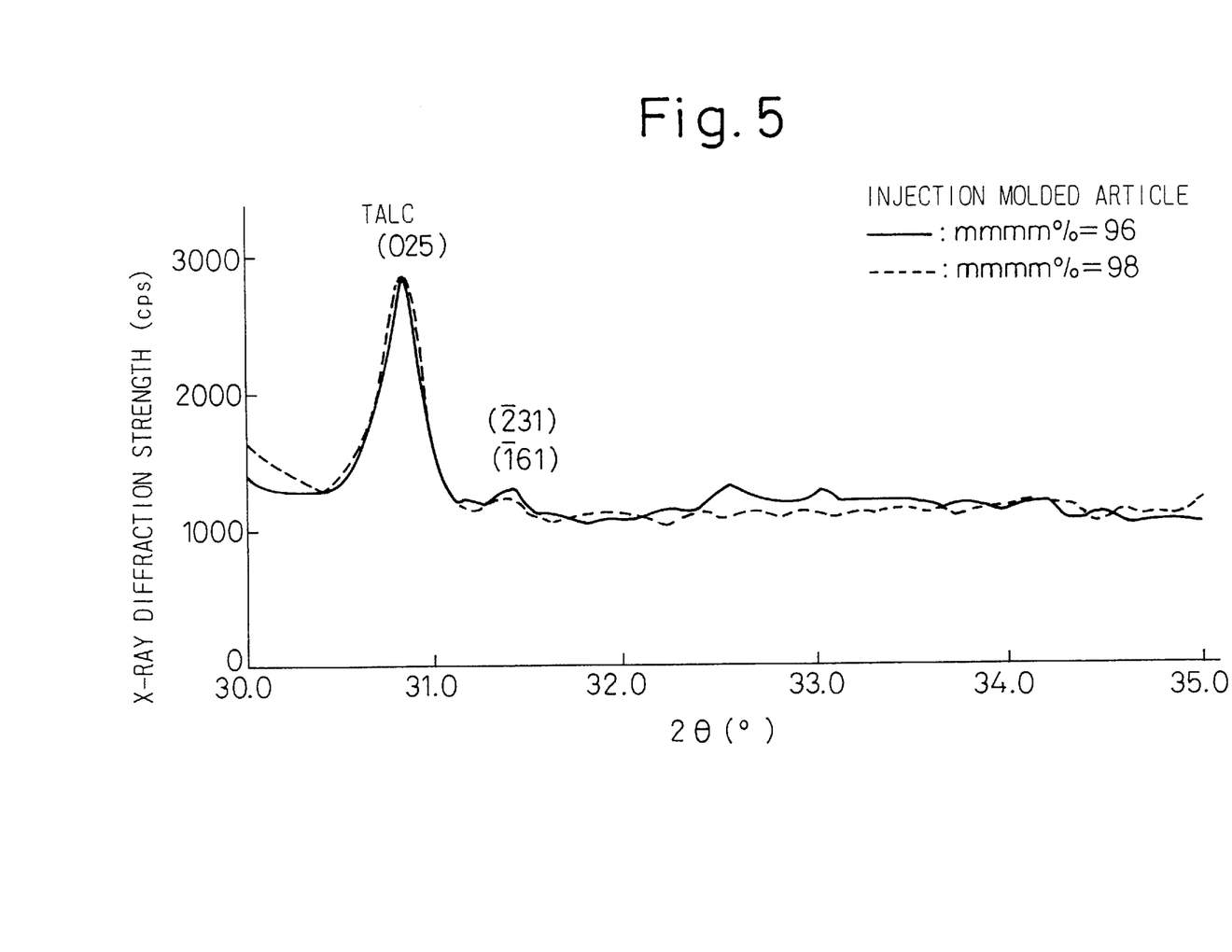
FIG. 5 is an X-ray diffraction pattern of samples of Examples 5 and 6.

The surfaces of injection molded articles of the samples of Examples 5 and 6 were observed by X-ray diffraction, wherein diffraction peaks based on P21/c could be observed (see FIG. 5).

Example 8

The microstructures of the surface portion and internal of an injection molded article of the sample of Example 6 in Table III were observed by an electron microscope. The results are shown in FIGS. 6 and 7.

Figure 6:
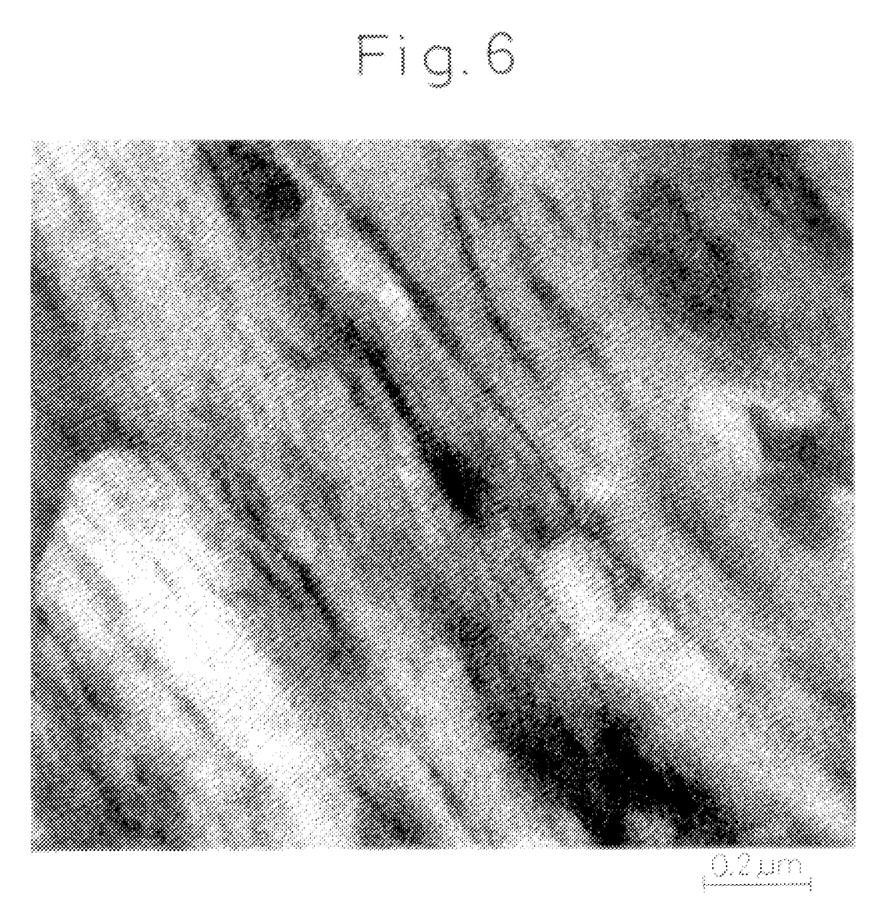
FIG. 6 is an electron micrograph of the microstructure of the surface portion of an injection molded article of the sample of Example 6.
Figure 7:
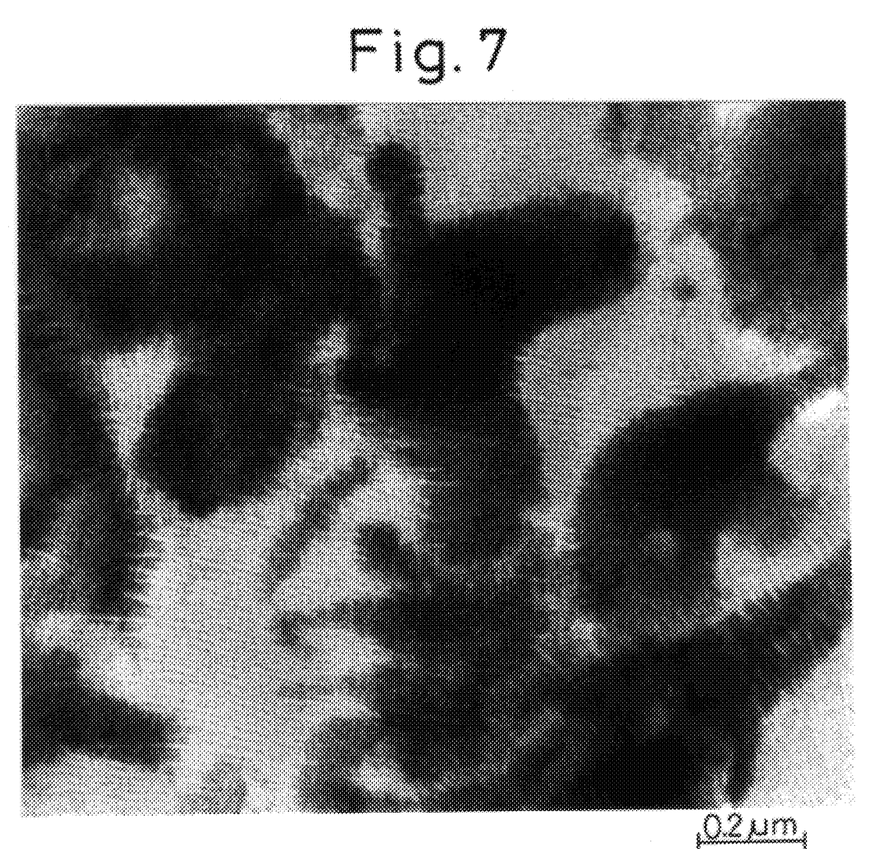
FIG. 7 is an electron micrograph of the microstructure of the inside of an injection molded article of the sample of Example 6.

At the surface portion, as shown in FIG. 6, a structure was shown of lamellae crystals of isotactic polypropylene intermixed with the rubber component. The structure was an ultrafine one in which it was not possible to discern which of the crystal phase and rubber phase was the sea or islands. On the other hand, as is clear from the results of FIG. 7, the lamellae crystals invaded the rubber phase in the interior portion showing that they easily mixed with each other.

Example 9

The samples shown as Sample No. 7, 8 and 9 in Table I were treated similarly with Example 2 to obtain sheet-like samples. Then the X-ray diffractions thereof were measured by the reflection method. As the result, the appearance of diffraction peaks derived from the diffraction planes which appear at the space group P21/c and do not appear at C2/c or Cc happen for the samples shown as Sample No. 8 and 9 in Table I, while no appearance of said diffraction peaks happens for the samples shown as Sample No. 7 in Table I.

Comparative Example 1

The sample shown in Table III was obtained by melt kneading. The same procedure was followed as in Examples 5 and 6 to prepare ASTM test pieces and measure the physical properties of the test pieces. The results are shown in Table III.

Further, the surface of an injection molded article of the sample of Comparative Example 1 was examined by X-ray diffraction, but no diffraction peak based on P21/c could be observed.

As is explained above, the propylene resin composition according to the present invention has a superior rigidity and low-temperature impact resistance, as well as a superior heat resistance, fluidity when melted, and other physical properties. Therefore it is clear that the present propylene resin composition is more useful compared with conventional known propylene compositions.

Comparative Example 2

The samples shown as Sample No. 1, 2 and 3 in Table I were treated similarly with Example 2 to obtain sheet-like samples. However, the mechanical strengths of these sheet-like samples were very poor and, as a result, were not able to be put to practical use. Therefore, no measurement of the X-ray diffractions were performed.

We claim:

1. A polypropylene resin composition comprising an isotactic polypropylene component, a rubber component, and an inorganic filler component, wherein:

(a) the melt flow rate, according to ASTM D1238, is at least 20 g/10 min;

(b) the flexural modulus, according to ASTM D790, is at least 2300 MPa;

(c) the Izod impact strength, according to ASTM D256, is at least 180 J/m at 23° C. and at least 45 J/m at −30° C.;

(d) the heat deformation temperature, according to ASTM D648, is at least 130° C.; and (e) there is a diffraction peak unique to polypropylene of space group P21/c in a diffraction pattern measured by a wide angle X-ray diffraction method in an injection molded article of the composition formed under a quenching condition.

2. A polypropylene resin composition according to claim 1, wherein the isotactic polypropylene component has a weight average molecular weight of $17 \times 10^4$ to $34 \times 10^4$ and a pentad isotacticity of 96% or more.

3. A polypropylene resin composition comprising:

(I) 50 to 70% by weight of a polypropylene block copolymer composed of 15 to 30% by weight of α-olefin structural units in a propylene-α-olefin random copolymer constituting a soluble component in p-xylene at room temperature and containing 7 to 15% by weight of a propylene-α-olefin random copolymer component or a blend of the polypropylene block copolymer with an isotatic polypropylene;

(II) 10 to 35% of an ethylene-α-olefin random copolymer composed of 30 to 85% by weight of ethylene structural units; and (III) 5 to 25% of an inorganic filler.

4. A polypropylene resin composition according to claim 3, wherein the isotactic polypropylene component in the polypropylene block copolymer or the blend thereof with the isotactic polypropylene has a weight average molecular weight of $17 \times 10^4$ to $34 \times 10^4$ and a pentad isotacticity of 96% or more.

* * * * *